United States Patent [19]

Huddleston et al.

[11] Patent Number: 4,938,803

[45] Date of Patent: Jul. 3, 1990

[54] VINYL GRAFTED LIGNITE FLUID LOSS ADDITIVES

[75] Inventors: David A. Huddleston; Charles D. Williamson, both of Sugar Land, Tex.

[73] Assignee: Nalco Chemical Company, Naperville, Ill.

[21] Appl. No.: 375,548

[22] Filed: Jul. 5, 1989

[51] Int. Cl.$^5$ .................. C04B 24/34; C08K 51/00; C09K 7/02

[52] U.S. Cl. .................... 106/719; 106/720; 106/669; 106/803; 527/500; 527/400; 523/202; 524/3; 524/5; 252/8.513

[58] Field of Search ............... 106/93, 90, 92; 166/295, 293; 527/500, 400; 523/202; 524/315; 252/8.513, 8.514

[56] References Cited

U.S. PATENT DOCUMENTS

| | | | |
|---|---|---|---|
| 2,549,507 | 4/1951 | Morgan et al. | 106/93 |
| 3,234,154 | 2/1966 | Martin | 106/93 |
| 3,359,225 | 12/1967 | Weisend | 106/93 |
| 4,015,991 | 4/1977 | Persinski et al. | 524/5 |
| 4,258,790 | 3/1981 | Hale | 106/93 |
| 4,387,205 | 6/1983 | Zaslavsky et al. | 527/400 |
| 4,515,635 | 5/1985 | Rao et al. | 106/90 |
| 4,671,883 | 6/1987 | Connell et al. | 166/282 |
| 4,676,317 | 6/1987 | Fry et al. | 166/293 |
| 4,678,591 | 7/1987 | Giddings et al. | 252/8.514 |
| 4,700,780 | 10/1987 | Brothers | 106/90 |
| 4,703,801 | 11/1987 | Fry et al. | 106/90 |
| 4,710,526 | 12/1987 | Tokumoto et al. | 524/5 |
| 4,743,301 | 5/1988 | Ito et al. | 106/314 |
| 4,806,164 | 2/1989 | Brothers | 106/90 |
| 4,846,888 | 7/1989 | Detroit | 106/93 |
| 4,871,825 | 10/1989 | Lin | 527/400 |

FOREIGN PATENT DOCUMENTS

| | | | |
|---|---|---|---|
| 2121629 | 6/1987 | Japan | 527/400 |
| 3097612 | 4/1988 | Japan | 527/400 |
| 2210888 | 6/1989 | United Kingdom | 527/500 |

*Primary Examiner*—Mark L. Bell
*Assistant Examiner*—Sue Hollenbeck
*Attorney, Agent, or Firm*—Paul D. Greeley; Donald G. Epple; Anthony L. Cupoli

[57] ABSTRACT

A vinyl grafted lignite fluid loss additive comprising a lignite grafted with at least one vinyl monomer selected from the group consisting of: dimethylaminopropyl methacrylamide, methacrylamido propyltrimethyl ammonium chloride, N-vinylformamide, N-vinylacetamide, diallyl dimethyl ammonium chloride, and diallylamine. The vinyl monomer may also be blended with at least one co-monomer. Preferred co-monomers are: 2-acrylamido-2-methylpropanesulfonic acid, dimethylacrylamide, acrylamide, vinylpyrrolidone, vinylacetate, acrylonitrile, dimethylaminoethyl methacrylate, styrenesulfonate, vinylsulfonate, dimethylaminoethyl methacrylate methyl chloride quaternary, acrylic acid and its salts.

22 Claims, No Drawings

VINYL GRAFTED LIGNITE FLUID LOSS ADDITIVES

BACKGROUND OF THE INVENTION

The present invention provides an improved fluid loss additive comprising a lignite grafted with at least one vinyl monomer selected from the group consisting of: dimethylaminopropyl methacrylamide, methacrylamido propyltrimethyl ammonium chloride, N-vinylformamide, N-vinylacetamide, diallyl dimethyl ammonium chloride, and diallylamine. The vinyl monomer may also be blended with at least one co-monomer. The co-monomer is preferably selected from the group consisting of: 2-acrylamido-2-methylpropanesulfonic acid, dimethylacrylamide, acrylamide, vinylpyrrolidone, vinylacetate, acrylonitrile, dimethylaminoethyl methacrylate, styrenesulfonate, vinylsulfonate, dimethylaminoethyl methacrylate methyl chloride quaternary, acrylic acid and its salts.

Fluid loss additives are typically used in drilling and cementing oil wells. That is, for oil field drilling and cementing operations to be successful, additives which reduce fluid loss are required to be added to the mud and cement. Such additives will be used in well operations where the bottom hole circulating temperature (BHCT) may range from 80°-400° F., substantial salt concentrations may be present, and cement slurry retardation and viscosity are critical aspects a the same effect pumpability and compressive strength. The fluid loss additive is also effective in controlling filtration properties in both fresh and sea water muds with high concentrations of soluble calcium.

Certain polymer compositions have long been recognized by those skilled in the art as additives useful in reducing fluid loss. These compositions are commonly referred to as "fluid loss additives".

Some examples of fluid loss additives are set forth in the following U.S. Pat. Nos.: 4,678,591 (Giddings et al.), issued July 7, 1987, 4,515,635 (Rao et al.), issued May 7, 1985, and 4,676,317 (Fry et al. , issued June 30, 1987.

The Rao patent discloses typical polymers used as fluid loss additives, e.g., copolymers of N,N-dimethylacrylamide and 2-acrylamido-2-methylpropanesulfonic acid having molar ratios of between 1:4 and 4:1, respectively, and an average molecular weight of between about 75,000 and about 300,000. Other fluid loss additives disclosed in the Rao patent are: a copolymer of a sulfonic acid modified acrylamide and a polyvinyl crosslinking agent, and a hydrolyzed copolymer of acrylamide and 2-acrylamido 2-methylpropanesulfonic acid (AMPS).

Giddings et al. disclose a terpolymer composition for aqueous drilling fluids comprising sodium AMPS (72-3.8%), N,N-dimethylacrylamide (13.5-0.7%), and acrylonitrile (9.5-0.5%). This terpolymer composition also contains lignin, modified lignin, brown coal, or modified brown coal in an amount ranging from between 5-95% with the lignin, modified lignin, brown coal, or modified brown coal having been present during the polymerization of the water-soluble polymer. It has a molecular weight in the range of 10,000-500,000. The lignin, modified lignin, brown coal, or modified brown coal is from the group consisting of lignites, sulfonated lignites, lignins, leonardites, lignosulfonates, alkali metal humic acid salts, humic acids, and sulfonated humic acids.

Another fluid loss additive disclosed in Giddinqs et al. is RESINEX, a sulfonated lignite complexed with sulfonated phenolic resin.

The Fry patent discloses a graft polymer fluid loss additive comprising a backbone of at least one member selected from the group consisting of lignin, lignite, and there salts, and a grafted pendant group of at least one member selected from the group consisting of AMPS, acrylonitrile, N,N-methylacrylamide, acrylic acid, N,N-dialkylaminoethyl methacrylate, wherein the alkyl radical comprises at least one member selected from the group consisting of methyl, ethyl and ropyl radicals.

The petroleum industry prefers a fluid loss additive that has as little effect on compressive strength, set time, viscosity, and thickening time as possible; a fluid loss additive that is salt tolerable (i.e., does not exhibit substantial loss of effectiveness in the presence of salt); and a fluid loss additive that is chemically stable during cementing operations. Furthermore, fluid loss additives should be compatible with as many other additives and environmental conditions as possible, should be soluble in cement slurries at normal ambient temperatures encountered in oil well cementing operations, and should continue to provide fluid loss characteristics over broad temperature and cement pH ranges.

The present inventors have developed novel vinyl rafted lignite fluid loss additives which encompass much of the aforementioned desired characteristics. That is, the novel fluid loss additives of the present invention are relatively unaffected by changes in salinity and temperature. Furthermore, the fluid loss additives of the present invention demonstrated better fluid loss characteristics in both fresh water and salt water, at varying temperatures, verses conventional fluid loss additives. The fluid loss additives of the present invention are especially effective compared to conventional fluid loss additives, e.g., Resinex, in drilling fluids at temperatures of about 350° F.

The fluid loss additives of the present invention contain amine based and/or quaternary nitrogen containing monomers which are relatively hydrolytically stable in use and are salt/brine tolerant. That is, the vinyl monomers of the present invention will impart an amine or quaternary nitrogen functionality to the co-graft, such that they are stable or relatively stable under use conditions. Various vinyl monomers of the present invention will hydrolyze in a cement slurry to an amine functionality that stays with the co-graft.

Additional advantages of the present invention shall become apparent as described below.

SUMMARY OF THE INVENTION

A vinyl grafted lignite fluid loss additive comprising a lignite grafted with at least one vinyl monomer selected from the group consisting of: dimethylaminopropyl methacrylamide, methacrylamido propyltrimethyl ammonium chloride, N-vinylformamide, N-vinylacetamide, diallyl dimethyl ammonium chloride, and diallylamine. The vinyl monomer may also be blended with at least one co-monomer. The co-monomer is preferably selected from the group consisting of: 2-acrylamido-2-methylpropanesulfonic acid, dimethylacrylamide, acrylamide, vinylpyrrolidone, vinylacetate, acrylonitrile, dimethylaminoethyl methacrylate, styrenesulfonate, vinylsulfonate, dimethylaminoethyl methacrylate methyl chloride quaternary, acrylic acid and its salts.

Preferred blends of vinyl monomer(s) and/or comonomer(s) are as follows: 2-acrylamido-2-methylpropanesulfonic acid/dimethylaminopropyl methacrylamide/dimethylacrylamide, 2-acrylamido-2-methylpropanesulfonic acid/dimethylaminopropyl methacrylamide, 2-acrylamido-2-methylpropanesulfonic acid/methacrylamido propyltrimethyl ammonium chloride, 2-acrylamido-2-methylpropanesulfonic acid/dimethylaminopropyl methacrylamide/acrylamide, and 2-acrylamido-2-methylpropanesulfonic acid/dimethylacrylamide/methacrylamido propyltrimethyl ammonium chloride.

The vinyl grafted lignite fluid loss additives have a molecular weight in the range between about 100,000 to about 750,000.

The lignite is typically at least one material selected from the group consisting of: lignites, sulfonated lignites, lignins, leonardites, lignosulfonates, alkali metal humic acid salts, humic acids, and sulfonated humic acids. The lignite is present in an amount between about 5 to about 95 weight percent, preferably an amount of between about 20 to about 40 weight percent.

The monomer(s) is present in an amount between about 5 to about 95 weight percent, preferably about 60 to about 80 weight percent.

A further object of the present invention is a process for forming an oil well cement composition comprising: mixing cement and a fluid loss additive of a lignite grafted with at least one vinyl monomer selected from the group consisting of: dimethylaminopropyl methacrylamide, methacrylamido propyltrimethyl ammonium chloride, N-vinylformamide, N-vinylacetamide, diallyl dimethyl ammonium chloride, and diallylamine. The vinyl monomer may also be blended with at least one co-monomer. Thereafter, the blend of cement and fluid loss additive is mixed with fresh water and pumped down the hole. A drilling fluid is prepared by adding the fluid loss additives of the present invention to circulating drilling mud to control fluid loss.

The vinyl grafted lignite fluid loss additive is admixed with dry cement in an amount between about 0.2 to about 2 percent by weight of the dry cement. When used as a drilling fluid, the fluid loss additive is added to the circulating mud in the range between about 0.5 to about 10 lbs. per barrel of mud.

The present invention may also include many additional features which shall be further described below.

DESCRIPTION OF THE PREFERRED EMBODIMENTS

The present invention provides a novel fluid loss additive comprising: a lignite grafted with at least one vinyl monomer selected from the group consisting of: dimethylaminopropyl methacrylamide (DMAPMA), methacrylamido propyltrimethyl ammonium chloride (MAPTAC), N-vinylformamide, N-vinylacetamide, diallyl dimethyl ammonium chloride (DADMAC), and diallylamine.

The vinyl monomer may also be blended with at least one co-monomer. The co-monomers are preferably selected from the group consisting of: 2-acrylamido-2-methylpropanesulfonic acid (AMPS, dimethylacrylamide (DMAM), acrylamide (ACAM), vinylpyrrolidone, vinylacetate, acrylonitrile (ACN), dimethylaminoethyl methacrylate (DMAEMA), styrenesulfonate, vinylsulfonate, dimethylaminoethyl methacrylate methyl chloride .quaternary (DMAEMA-MCQ), acrylic acid and its salts.

The fluid loss additives typically have a molecular weight in the range between about 100,000 to about 750,000.

The fluid loss additive is preferably lignite grafted with a blend of vinyl monomer(s) and/or co-monomer(s). Preferred blends are as follows 2-acrylamido-2-methylpropanesulfonic acid/dimethylaminopropyl methacrylamide/dimethylacrylamide, 2-acrylamido-2-methylpropanesulfonic acid/dimethylaminopropyl methacrylamide, 2-acrylamido-2-methylpropanesulfonic acid/methacrylamido propyltrimethyl ammonium chloride, 2-acrylamido-2-methylpropanesulfonic acid/dimethylaminopropyl methacrylamide/acrylamide, and 2-acrylamido-2-methylpropanesulfonic acid/dimethylacrylamide/methacrylamido propyltrimethyl ammonium chloride.

The preferred blends of vinyl monomer(s) and/or co-monomer(s) being mixed in the following proportions. The blend of 2-acrylamido-2-methylpropanesulfonic acid(AMFS)/dimethylaminopropyl methacrylamide(DMAPMA)/dimethylacrylamide(DMAM) has a molar ratio of 60:10:30, respectively. The blend of 2-acrylamido-2-methylpropanesulfonic acid(AMPS)/dimethylaminopropyl methacrylamide(DMAPMA) has a molar ratio in the range between about 95:5 to about 75:25, respectively. The blend of 2-acrylamido-2-methylpropanesulfonic acid(AMPS)/methacrylamido propyltrimethyl ammonium chloride(MAPTAC) has a molar ratio in the range between about 90:10 to about 80:20, respectively. The blend of 2-acrylamido-2-methylpropanesulfonic acid(AMPS)/dimethylaminopropyl methacrylamide(DMAPMA)/acrylamide(ACAM) has a molar ratio of 85:5:10, respectively. The blend of 2-acrylamido-2-methylpropanesulfonic acid(AMPS)/dimethylacrylamide(DMAM)/methacrylamido propyltrimethyl ammonium chloride(MAFTAC) has a molar ratio of 60:30;10, respectively.

In the process of forming vinyl grafted lignites according to the present invention, a solution of lignite material and either a vinyl monomer or a blend of vinyl monomer(s) and/or co-monomer(s) are charged into a vessel in the presence of an initiator, such as, ammonium persulfate. This polymerization process grafts the lignite to the monomer(s).

The lignite is at least on material selected from the group consisting of: lignites, sulfonated lignites, lignins, leonardites, lignosulfonates, alkali metal humic acid salts, humic acids, and sulfonated humic acids. The lignite is present in an amount between about 5 to about 95 weight percent, preferably an amount of between about 20 to about 40 weight percent.

The monomer(s material is present in an amount between about 5 to 95 weight percent, preferably about 60 to about 80 weight percent.

The fluid loss additives of the present invention may be used in a wide range of drilling fluid types including the following: fresh water muds, fresh water muds contaminated with calcium or other multivalent ions, sea water muds, gypsum muds, and lime muds.

The oil well cement composition of the present invention may be formed by mixing cement and a fluid loss additive comprising: a lignite grafted with at least one vinyl monomer selected from the group consisting of: dimethylaminopropyl methacrylamide, methacrylamido propyltrimethyl ammonium chloride, N-vinylformamide, N-vinylacetamide, diallyl dimethyl ammonium chloride, and diallylamine. The vinyl monomer may also be blended with at least one co-monomer.

Thereafter, the blended cement and fluid loss additive are mixed with fresh water and pumped down the hole. The fluid loss additive of the present invention is admixed with cement in an amount between about 0.2 to about 2 percent by weight of dry cement.

The water used in forming an oil well cement composition may contain various salts, such as sodium chlorides, potassium chloride, calcium chloride, and the like.

Other types of well known and conventional additives can also be incorporated into the oil well cement composition in order to modify its properties. Such additives may include: additional fluid loss additives or viscosifiers, retarders, accelerators, dispersants, weight-adjusting materials, and fillers. Specific additives are set forth in U.S. Pat. No. 4,676,317 (Fry et al.) which is incorporated herein by reference.

When used as a drilling fluid, the fluid loss additive is added to the circulating mud in an amount between about 0.5 to about 10 lbs. per barrel of mud.

EXAMPLE 1

The below listed samples in Table 1 were tested as drilling fluids:

TABLE 1

| Sample | Lig. | AMPS | DMAPMA | DMAM | MAPTAC | ACAM | Mol. Wt. |
|---|---|---|---|---|---|---|---|
| 1 | 20 | 75 | 25 | | | | 126,000 |
| 2 | 20 | 60 | 10 | 30 | | | 101,000 |
| 3 | 20 | 90 | 10 | | | | 158,000 |
| 4 | 20 | 80 | | | 20 | | 229,000 |
| 5 | 20 | 90 | | | 10 | | 390,000 |
| 6 | 20 | 85 | 5 | | | 10 | 715,000 |
| 7 | 20 | 95 | 5 | | | | 325,000 |
| 8 | 20 | 60 | 10 | 30 | | | 300,000 |
| 9 | 20 | 60 | | 30 | 10 | | 350,000 |
| 10 | 33 | 60 | 10 | 30 | | | 132,000 |
| 11 | | Lignin | | | | | 95,000 |
| 12 | | Lignosulfonate | | | | | 78,000 |

The AMPS, DMAPMA and DMAM were grafted at 60:10:30 mole percent, respectively, to lignin and lignosulfonate. The aforementioned fluid loss additives of the present invention, i.e., samples 1–10, lignin (sample 11), nosulfonate (sample 12), a blank sample, and Resinex (a conventional fluid loss additive) were tested as drilling fluids in muds aged at 350° F. for 16 hours. The fluid loss data set forth in Table 2 below was taken at 350° F., where $\Delta P = 500$ psi. The following fluid loss characteristics were measured: apparent viscosity (AV), plastic viscosity (PV), yield point (YP), and API 30 minute fluid loss.

The drilling fluid contained the following: 280 grams water; 15 grams bentonite; 40 grams rev dust; 4 grams chrome lignosulfonate; 294 grams barite; 10.6 grams sea salt; and 2–4 grams fluid loss additive.

TABLE 2

| Sample | AV | PV | YP | 10 Sec. | 10 Min. | 350° F. Fluid Loss |
|---|---|---|---|---|---|---|
| 1 | 28 | 29 | −1 | 1 | 1 | 128 |
| 2 | 50 | 31 | 37 | 17 | 28 | Blew dry |
| 3 | 50 | 46 | 8 | 3 | 10 | 44 |
| 4 | 36 | 35 | 2 | 3 | 3 | 2 |
| 5 | 56 | 55 | 3 | 2 | 3 | 32 |
| 6 | 39 | 44 | −10 | 1½ | 1½ | 66 |
| 7 | 48 | 45 | 7 | 2 | 12 | 40 |
| 8 | 58 | 40 | 35 | 20 | 70 | 36 |
| 9 | 54 | 34 | 40 | 15 | 64 | 26 |
| 10 | 54 | 36 | 36 | 24 | 51 | 37 |
| 11 | 48 | 37 | 23 | 10 | 28 | 66 |
| 12 | 50 | 37 | 27 | 13 | 33 | 40 |
| Blank | 38 | 19 | 37 | 30 | 51 | Blew dry |
| Resinex | 48 | 35 | 25 | 26 | 64 | 78 |

EXAMPLE 2

Using the same samples and drilling fluid set forth in Example 1 above, the following fluid loss performance data in Table 3 was obtained.

TABLE 3

| Sample | AV | PV | YP | 10 Sec. | 10 Min. | 150° F. Fluid Loss |
|---|---|---|---|---|---|---|
| 1 | 32 | 30 | 4 | 3 | 20 | 39 |
| 2 | 38 | 36 | 4 | 5 | 22 | 28 |
| 3 | 36 | 34 | 3 | 3 | 16 | 30 |
| 4 | 44 | 40 | 9 | 4 | 13 | 21 |
| 5 | 44 | 42 | 3 | 3 | 12 | 18 |
| 6 | 46 | 37 | 18 | 8 | 22 | 14 |
| 7 | 41 | 38 | 8 | 3 | 22 | 13 |
| 8 | 44 | 44 | −1 | 20 | 32 | 43 |
| 9 | 50 | 39 | 21 | 24 | 37 | 21 |
| 10 | 41 | 36 | 8 | 13 | 34 | 38 |
| 11 | 24 | 26 | −4 | 1½ | 2 | 20 |
| 12 | 25 | 26 | −2 | 3 | 3 | 26 |
| Blank | 32 | 24 | 17 | 8 | 29 | 78 |
| Resinex | 32 | 25 | 13 | 7 | 26 | 20 |

EXAMPLE 3

The samples set forth in Example 1 above were also tested for fluid loss performance when used as fluid loss additives to cement. The cement slurries contained the following: 753 grams class H cement; 286.1 grams water; 0–51.5 grams sodium chloride; and 7.53 grams fluid loss additive. The results are set forth below in Table 4.

TABLE 4

| Class H Cement | 38% Water | | 18% Salt | |
|---|---|---|---|---|
| Additive (1%) | 125° F. | 180° F. | 125° F. | 180° F. |
| Sample 1 | 23 | 40 | 42 | 86 |
| Sample 2 | | | 29 | 39 |
| Sample 3 | | | 42 | 57 |
| Sample 4 | | | 39 | 66 |
| Sample 5 | | | 41 | 57 |

While we have shown and described several embodiments in accordance with our invention, it is to be clearly understood that the same are susceptible to numerous changes and modifications apparent to one skilled in the art. Therefore, we do not wish to be limited to the details shown and described, but intend to show all changes and modifications which come within the scope of the appended claims.

What is claimed is:

1. A vinyl grafted lignite fluid loss additive comprising a lignite grafted with:
   at least one vinyl monomer selected from the group consisting of dimethylaminopropyl methacrylamide, methacrylamido propyltrimethyl ammonium chloride, N-vinylformamide, N-vinylacetamide, diallyl dimethyl ammonium chloride, and diallylamine; and
   at least one co-monomerer selected from the group consisting of: 2-acrylamido-2-methylpropanesulfonic acid, dimethylacrylamide, acrylamide, vinyl pyrrolidone, vinylacetate, acrylonitrile, dimethylaminoethyl methacrylate, styrenesulfonate, vinylsulfonate, dimethylaminoethyl methacrylate methyl chloride quaternary, acrylic acid and its salts; whereby said vinyl monomer imparts an amine or quaternary nitrogen functionality to the co-graft, such that the co-graft is relatively stable to hydrolysis.

2. The fluid loss additive according to claim 1, wherein said lignite is at least one material selected from the group consisting of: lignites, sulfonated lignites, lignins, leonardites, lignosulfonates, alkali metal humic acid salts, humic acids, and sulfonated humic acids.

3. The fluid loss additive according to claim 1, wherein said lignite is present in an amount of between about 5 to about 95 weight percent.

4. The fluid loss additive according to claim 3, wherein said lignite is present in an amount between about 20 to about 40 weight percent.

5. The fluid loss additive according to claim 1, wherein said fluid loss additive is selected from the group consisting of: 2-acrylamido-2-methylpropanesulfonic acid/dimethylaminopropyl methacrylamide/dimethylacrylamide, 2-acrylamido-2-methylpropanesulfonic acid/dimethylaminopropyl methacrylamide, 2-acrylamido-2-methylpropanesulfonic acid/methacrylamido propyltrimethyl ammonium chloride, 2-acrylamido-2-methylpropanesulfonic acid/dimethylaminopropyl methacrylamide/acrylamide, and 2-acrylamido-2-methylpropanesulfonic acid/dimethylacrylamide/methacrylamido propyltrimethyl ammonium chloride.

6. The fluid loss additive according to claim 1, wherein said monomers are present in an amount between about 95 to about 5 weight percent.

7. The fluid loss additive according to claim 6, wherein said monomers are present in an amount between about 60 to about 80 weight percent.

8. The fluid loss additive according to claim 1, wherein said additive is 2-acrylamido-2-methylpropanesulfonic acid/dimethylaminopropyl methacrylamide/dimethylacrylamide having a molar ratio of about 60:10:30, respectively.

9. The fluid loss additive according to claim 1, wherein said additive is 2-acrylamido-2-methylpropanesulfonic acid/dimethylaminopropyl methacrylamide having a molar ratio of about 90:10, respectively.

10. The fluid loss additive according to claim 1, wherein said monomers are 2-acrylamido-2-methylpropanesulfonic acid/methacrylamido propyltrimethyl ammonium chloride having a molar ratio of about 80;20, respectively.

11. The fluid loss additive according to claim 1, wherein said monomers are 2-acrylamido-2 methylpropanesulfonic acid/methacrylamido propyltrimethyl ammonium chloride having a molar ratio of about 90:10, respectively.

12. The fluid loss additive according to claim 1, wherein said monomers are 2-acrylamido-2-methylpropanesulfonic acid/dimethylaminopropyl methacrylamide having a molar ratio of about 75;25, respectively.

13. The fluid loss additive according to claim 1, wherein said monomers are 2-acrylamido-2-methylpropanesulfonic acid/dimethylaminopropyl methacrylamide/acrylamide having a molar ratio of about 85:5:10, respectively.

14. The fluid loss additive according to claim 1, wherein said monomers are 2-acrylamido-2-methylpropanesulfonic acid/dimethylacrylamide/methacrylamido propyltrimethyl ammonium chloride having a molar ratio of about 60;30:10, respectively.

15. The fluid loss additive according to claim 1, herein said vinyl grafted lignite has a molecular weight in the range between about 100,000 to about 750,000.

16. A process for forming an oil well cement composition comprising:
   mixing cement and a vinyl grafted lignite fluid loss additive comprising a lignite grafted with: at least one vinyl monomer selected from the group consisting of dimethylaminopropyl methacrylamide, methacrylamido propyltrimethyl ammonium chloride, N-vinylformamide, N-vinylacetamide, diallyl dimethyl ammonium chloride, and diallylamine; and at least one co-monomer selected from the group consisting of: 2-acrylamido-2-methylpropanesulfonic acid, dinmethylacrylamide, acrylamide, vinyl pyrrolidone, vinylacetate, acrylonitrile, dimethylaminoethyl methacrylate, styrenesulfonate, vinylsulfonate, dimethylaminoethyl methacrylate methyl chloride quaternary, acrylic acid and its salts, whereby said vinyl monomer imparts an amine or quaternary nitrogen functionality to the co-graft, such that the co-graft is relatively stable to hydrolysis; thereby forming a cement blend; and mixing said cement blend with fresh water.

17. The process according to claim 16, wherein said lignite is at least one material selected from the group consisting of: lignites, sulfonated lignites, lignins, leonardites, lignosulfonates, alkali metal humic acid salts, humic acids, and sulfonated humic acids.

18. The process according to claim 16, wherein said oil well cement composition also includes at least one additional additive selected from the group consisting of additional fluid loss additives or viscosifiers, retarders, accelerators, dispersants, weight-adjusting materials, and fillers.

19. The process according to claim 16, wherein said vinyl grafted lignite fluid loss additive is admixed with dry cement in an amount between about 0.2 to about 2 percent by weight of said dry cement.

20. A process for forming a drilling fluid composition comprising:
   adding a vinyl grafted lignite fluid loss additive to drilling mud, said fluid loss additive comprising a lignite grafted with:
   at least one vinyl monomer selected from the group consisting of dimethylaminopropyl methacrylamide, methacrylamido propyltrimethyl ammonium chloride, N-vinylformamide N-vinylacetamide. diallyl dimethyl ammonium chloride, and diallylamine; and at least one co-monomer selected from the group consisting of: 2-acrylamido-2-methylpropanesulfonic acid, dimethylacrylamide, acrylamide, vinyl pyrrolidone, vinylacetate, acrylonitrile, dimethylaminoethyl methacrylate styrenesulfonate, vinylsulfonate, dimethylaminoethyl methacrylate methyl chloride quaternary, acrylic acid and its salts; whereby said vinyl monomer imparts an amine or quaternary nitrogen functionality to the co-graft, such that the co-graft is relatively stable to hydrolysis.

21. The process according to claim 20, wherein said lignite is at least one material selected from the group consisting of: lignites, sulfonated lignites, lignins, leonardites, lignosulfonates, alkali metal humic acid salts, humic acids, and sulfonated humic acids.

22. The process according to claim 20, wherein said vinyl grafted lignite fluid loss additive is added to said mud in an amount between about 0.5 to about 10 percent by weight of said mud.

* * * * *

UNITED STATES PATENT AND TRADEMARK OFFICE
CERTIFICATE OF CORRECTION

PATENT NO. : 4,938,803

DATED : July 3, 1990

INVENTOR(S) : Huddleston et al.

Page 1 of 2

It is certified that error appears in the above-identified patent and that said Letters Patent is hereby corrected as shown below:

Col. 1, line 29, delete "a" and insert therefor ---as---;
 line 42, delete "Fry et al." and insert therefor ---Fry et al.)---;
 and Line 52 insert a --- hyphen(-)--- between "2-acrylamido" and "2-methylpropanesulfonic".

Col. 2, line 12, delete "ropyl" and insert therefor --- propyl ---; and
 line 27, delete "rafted" and insert therefor --- grafted ---.

Col. 3, line 62. delete "(AMPS" and insert therefor --- (AMPS) ---.

Col. 4, line 6, after "follows" insert --- : ---;
 line 20, delete "(AMFS)" and insert therefor --- (AMPS) ---;
 line 45, delete "on" and insert therefor --- one ---; and
 line 52, delete "monomer(s" and insert therefor --- monomer(s) ---.

Col. 5, line 44, delete "nosulfonate" and insert therefor
 --- lignosulfonate ---.

Col. 7, line 54:
Claim 8, line 2, delete "additive is" and insert therefor -- monomers are ---.
Col. 7, line 59:
Claim 9, line 2, delete "additive is" and insert therefor ---monomers are --.
Col. 8, line 7:
Claim 12, line 4, delete ";" and insert therefor --- : ---.
Col. 8, line 17:
Claim 14, line 5, delete ";" and insert therefor --- : ---.
Col. 8, line 66:
Claim 20, line 9, after "N-vinylformamide" insert ---- , --- and after
 "N-vinylacetamide" delete "." and insert ---,---.

UNITED STATES PATENT AND TRADEMARK OFFICE
CERTIFICATE OF CORRECTION

PATENT NO. : 4,938,803

DATED : July 3, 1990

INVENTOR(S) : Huddleston et al.

It is certified that error appears in the above-identified patent and that said Letters Patent is hereby corrected as shown below:

Col. 10, line 5:
Claim 21, line 3, delete "Iignites" and insert therefor --- lignites ---.

Signed and Sealed this

Seventeenth Day of September, 1991

Attest:

HARRY F. MANBECK, JR.

Attesting Officer

Commissioner of Patents and Trademarks